(12) United States Patent
Kotzur et al.

(10) Patent No.: US 9,989,990 B2
(45) Date of Patent: Jun. 5, 2018

(54) CONNECTOR WITH STAGGERED ELECTRICAL PINS

(71) Applicant: Dell Products L.P., Round Rock, TX (US)

(72) Inventors: Gary B. Kotzur, Austin, TX (US); Marcelo Saraiva, Austin, TX (US); Bernard Strmiska, Rounch Rock, TX (US)

(73) Assignee: Dell Prodcuts L.P., Round Rock, TX (US)

( * ) Notice: Subject to any disclaimer, the term of this patent is extended or adjusted under 35 U.S.C. 154(b) by 143 days.

(21) Appl. No.: 14/971,274

(22) Filed: Dec. 16, 2015

(65) Prior Publication Data
US 2016/0181741 A1 Jun. 23, 2016

Related U.S. Application Data

(60) Provisional application No. 62/093,760, filed on Dec. 18, 2014.

(51) Int. Cl.
*G06F 1/16* (2006.01)
*G06F 1/18* (2006.01)
*H01R 12/71* (2011.01)

(52) U.S. Cl.
CPC ............... *G06F 1/16* (2013.01); *G06F 1/185* (2013.01); *H01R 12/716* (2013.01)

(58) Field of Classification Search
CPC .......... H01R 12/721; G06F 1/16; G06F 1/185
See application file for complete search history.

(56) References Cited

U.S. PATENT DOCUMENTS

| | | | | |
|---|---|---|---|---|
| 6,309,254 B1 * | 10/2001 | Korsunsky | ........... | H01R 12/721 439/60 |
| 6,561,850 B2 * | 5/2003 | Letourneau | ........... | H01R 12/714 439/108 |
| 7,229,321 B2 * | 6/2007 | Hegel | .................. | H01R 13/112 439/637 |
| 8,047,875 B2 * | 11/2011 | Yamakami | ......... | H01R 13/6315 439/108 |

* cited by examiner

*Primary Examiner* — Ross Gushi
(74) *Attorney, Agent, or Firm* — Jackson Walker L.L.P.

(57) ABSTRACT

A receptacle connector may include a housing for housing a first pin and a second pin. The first pin may be of a first length and configured to be coupled to a first corresponding pin of an information handling resource received by the receptacle connector, the first pin comprising two contact bumps for maintaining electrical contact with the first corresponding pin. The second pin may be of a second length and configured to be coupled to a second corresponding pin of the information handling resource. The second length may be substantially shorter than the first length such that when the information handling resource is inserted into the receptacle connector, the first corresponding pin engages with the first pin before the second corresponding pin engages with the second pin. The second pin may comprise one contact bump for maintaining electrical contact with the second corresponding pin.

21 Claims, 5 Drawing Sheets

CONNECTOR WITH STAGGERED ELECTRICAL PINS

RELATED APPLICATION

The present disclosure claims priority to U.S. Provisional Patent Application Ser. No. 62/093,760, filed Dec. 18, 2014, which is incorporated by reference herein in its entirety.

TECHNICAL FIELD

The present disclosure relates in general to information handling systems, and more particularly to a system and method for providing connections to an information handling system from storage media and/or other information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include within it various information handling resources, including without limitation processors, storage devices, network interfaces, and/or other devices. Such information handling resources are often modular, in the sense that such information handling resources may mechanically and electrically couple to an information handling system via a receptacle connector. A receptacle connector is typically a system, device, or apparatus mounted on a circuit board (e.g., motherboard, backplane, mid-plane, etc.) and having electrically-conductive pins configured to engage with corresponding electrically-conductive pins of a plug connector or edge connector of an information handling resource, in order to electrically couple the information handling resource to the circuit board. In some embodiments, the receptacle connector may be configured to allow for easy insertion and removal of the information handling resource into and from the receptacle connector by a user.

One feature often desired in an information handling resource is that it be hot pluggable. Hot plugging involves the addition of an information handling resource to expand functionality of an information handling system or removal of such an information handling resource without significant interruption to the operation of the information handling system. Thus, when an information handling resource is hot-pluggable, a user can insert and remove the information handling resource without rebooting or powering down the information handling resource.

In most instances, when inserting and removing a hot-pluggable information handling resource, it is desired that the various electrically-conductive pins of the information handling resource plug or edge connector be coupled to corresponding pins of the receptacle connector in a manner that allows for a desired sequencing of power and signals for the information handling resource. To accomplish this, many hot-pluggable information handling resources have plug or edge connectors with staggered pins. However, some types of information handling resources have pin outs and/or pin lengths conforming to a particular standard (e.g., the M.2 standard) and thus such devices cannot be modified to have staggered pins without deviating from the standard.

SUMMARY

In accordance with the teachings of the present disclosure, the disadvantages and problems associated with traditional connector form factors may have been reduced or eliminated.

In accordance with embodiments of the present disclosure, a receptacle connector may include a housing, a first pin, and a second pin. The first pin may be of a first length and may be disposed in the housing and configured to be coupled to a first corresponding pin of an information handling resource received by the receptacle connector, the first pin comprising two contact bumps for maintaining electrical contact with the first corresponding pin. The second pin may be of a second length and may be disposed in the housing and configured to be coupled to a second corresponding pin of the information handling resource. The second length may be substantially shorter than the first length such that when the information handling resource is inserted into the receptacle connector, the first corresponding pin engages with the first pin before the second corresponding pin engages with the second pin. The second pin may comprise one contact bump for maintaining electrical contact with the second corresponding pin.

In accordance with these and other embodiments of the present disclosure, an information handling system may include a processor and a receptacle connector communicatively coupled to the processor. The receptacle connector may include a housing, a first pin, and a second pin. The first pin may be of a first length and may be disposed in the housing and configured to be coupled to a first corresponding pin of an information handling resource received by the receptacle connector, the first pin comprising two contact bumps for maintaining electrical contact with the first corresponding pin. The second pin may be of a second length and may be disposed in the housing and configured to be coupled to a second corresponding pin of the information handling resource. The second length may be substantially shorter than the first length such that when the information handling resource is inserted into the receptacle connector, the first corresponding pin engages with the first pin before the second corresponding pin engages with the second pin. The second pin may comprise one contact bump for maintaining electrical contact with the second corresponding pin.

In accordance with these and other embodiments of the present disclosure, a method for engaging an information handling resource with a receptacle connector, may include engaging a first pin of a first length disposed in a housing of the receptacle connector with a first corresponding pin of the information handling resource, the first pin comprising two contact bumps for maintaining electrical contact with the first corresponding pin. The method may also include, after engaging the first pin with the first corresponding pin, engaging a second pin of a second length disposed in the housing with a second corresponding pin of the information handling resource, wherein the second length is substantially shorter than the first length and the second pin comprises one contact bump for maintaining electrical contact with the second corresponding pin.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4B, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
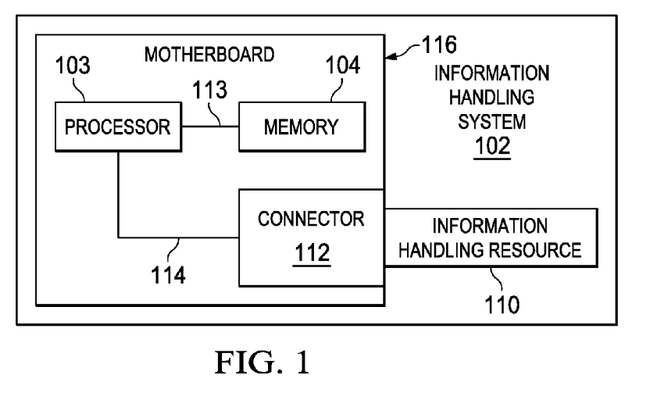
FIG. 1 illustrates a block diagram showing an example information handling system, in accordance with embodiments of the present disclosure.

FIG. 1 illustrates a block diagram of an example information handling system 102, in accordance with embodiments of the present disclosure. In certain embodiments, information handling system 102 may comprise a computer chassis or enclosure (e.g., a server chassis holding one or more server blades). In other embodiments, information handling system 102 may be a personal computer (e.g., a desktop computer or a portable computer). As depicted in FIG. 1, information handling system 102 may include a processor 103, a memory 104 communicatively coupled to processor 103 via a memory bus 113, an information handling resource 110 communicatively coupled to processor 103 via a connector 112 and an input/output (I/O) communication bus 114. Some components of information handling system 102 may be fixedly mounted (e.g., soldered) to a motherboard 116, while one or more information handling resources 110 and other components may be removably mounted to motherboard 116 via a corresponding connector (e.g., connector 112). While certain components (e.g., memory 104, processor 103) of information handling system 102 are not explicitly shown to be coupled to motherboard 116 via a corresponding connector, in some embodiments some of such components may be modular in nature and removably coupled to motherboard 116 via a corresponding connector.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory 104, and/or another component of information handling system 102.

Memory 104 may be communicatively coupled to processor 103 (e.g., via memory bus 113) and may comprise any system, device, or apparatus configured to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

One or more information handling resources 110 may be communicatively coupled to processor 103 (e.g., via a corresponding connector 112 and I/O communication bus 114) and may include any component system, device or apparatus of an information handling system, including without limitation processors, service processors, basic input/output systems, buses, memories, I/O devices and/or interfaces, storage resources, network interfaces, motherboards, and/or any other components and/or elements of an information handling system. As depicted in FIG. 1, information handling resource 110 may be removably coupled to connector 112. Accordingly, information handling resource 110 may include an edge connector, plug connector, or other suitable connector configured to mate with connector 112 in order to mechanically couple information handling resource 110 to motherboard 116 and electrically couple information handling resource 110 to I/O communication bus 114.

Connector 112 may comprise any system, device, or apparatus fixedly mounted on motherboard 116 and may be constructed to mechanically couple information handling resource 110 to motherboard 116 and to electrically couple information handling resource 110 to I/O communication bus 114 and other components coupled to I/O communication bus 114 (e.g., processor 103). Connector 112 may include a slot or other opening configured to removably receive a corresponding mating edge connector of information handling resource 110. Example embodiments of connector 112 are set forth in greater detail with respect to FIGS. 2 through 4B below.

I/O communication bus 114 may comprise any system, device, or apparatus configured to transfer data among components of information handling system 102.

Motherboard 116 may comprise any system, device, or apparatus configured to interconnect information handling resources of information handling system 102 with each other. Accordingly, motherboard 116 may include slots, pads, and/or other connectors configured to receive corresponding electrical connectors of information handling resources in order to electrically couple information handling resources to each other.

In addition to processor 103, memory 104, information handling resource 110, connector 112, memory bus 113, I/O communication bus 114, and motherboard 116, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
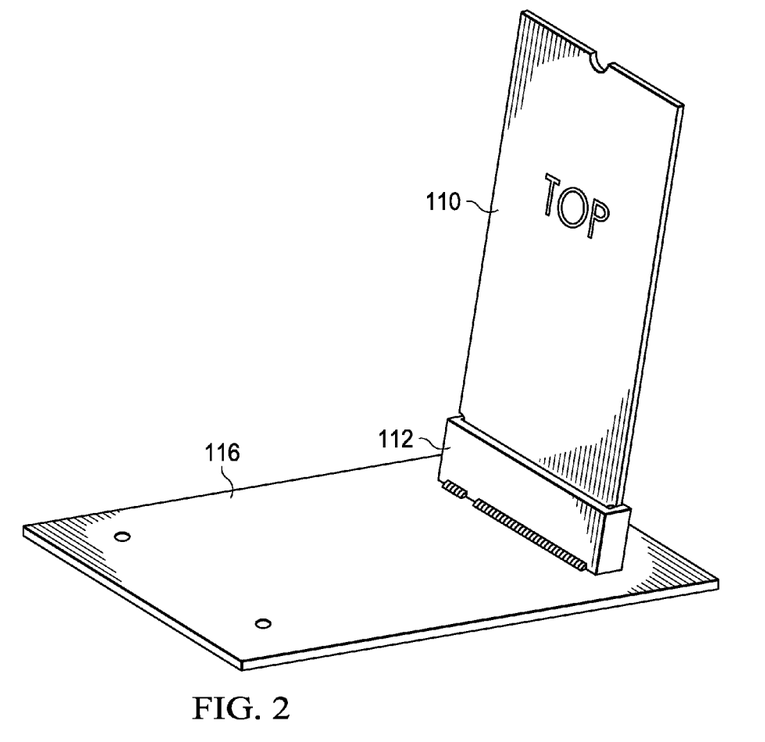
FIG. 2 illustrates a perspective view of an information handling resource engaged with a receptacle connector which is in turn electrically and mechanically coupled to a motherboard, in accordance with embodiments of the present disclosure.

FIG. 2 illustrates a perspective view of an information handling resource 110 engaged with a receptacle connector 112 which is in turn electrically and mechanically coupled to a motherboard 116. As shown in FIG. 2, connector 112 may be mounted to motherboard 116 or another circuit board such that when engaged with connector 112, a circuit board of information handling resource 110 is substantially perpendicular to motherboard 116.

Figure 3A:
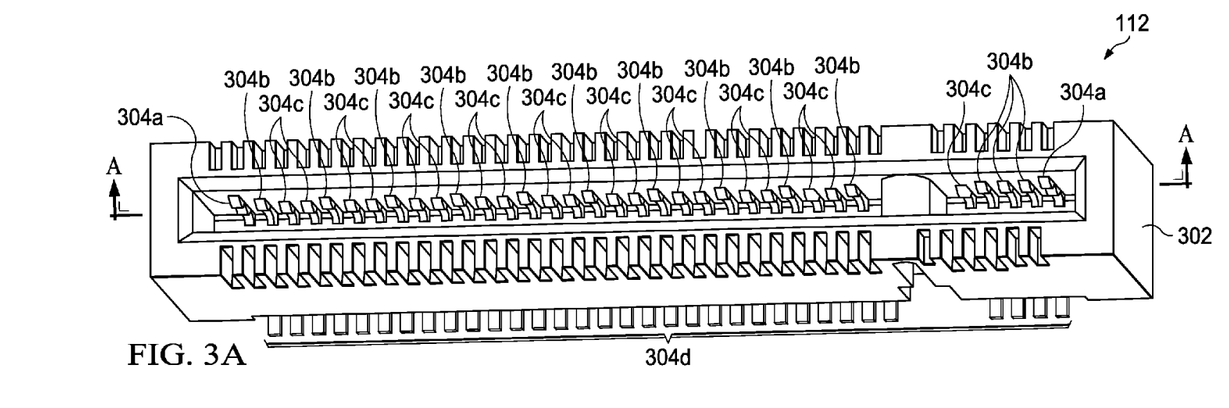
FIGS. 3A-3C each illustrate different views of a receptacle connector, in accordance with embodiments of the present disclosure.
Figure 3B:
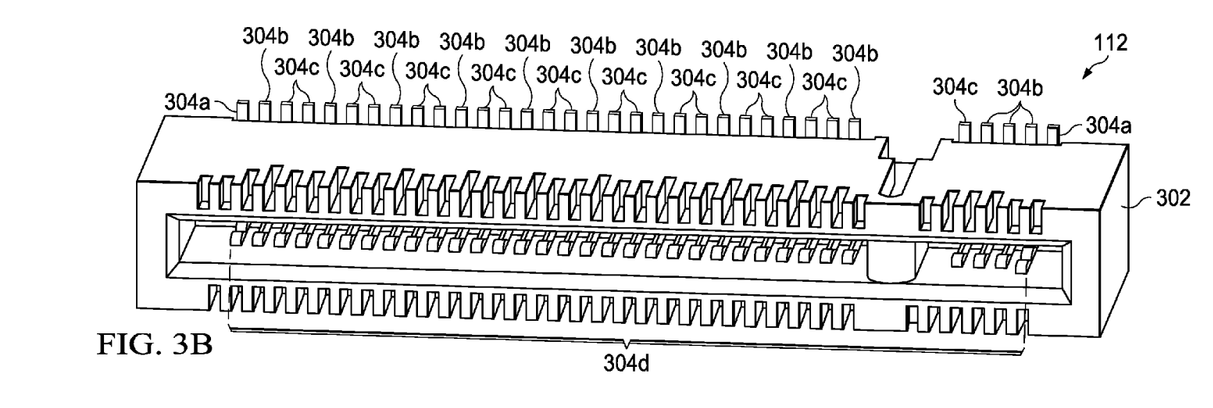
Figure 3C:
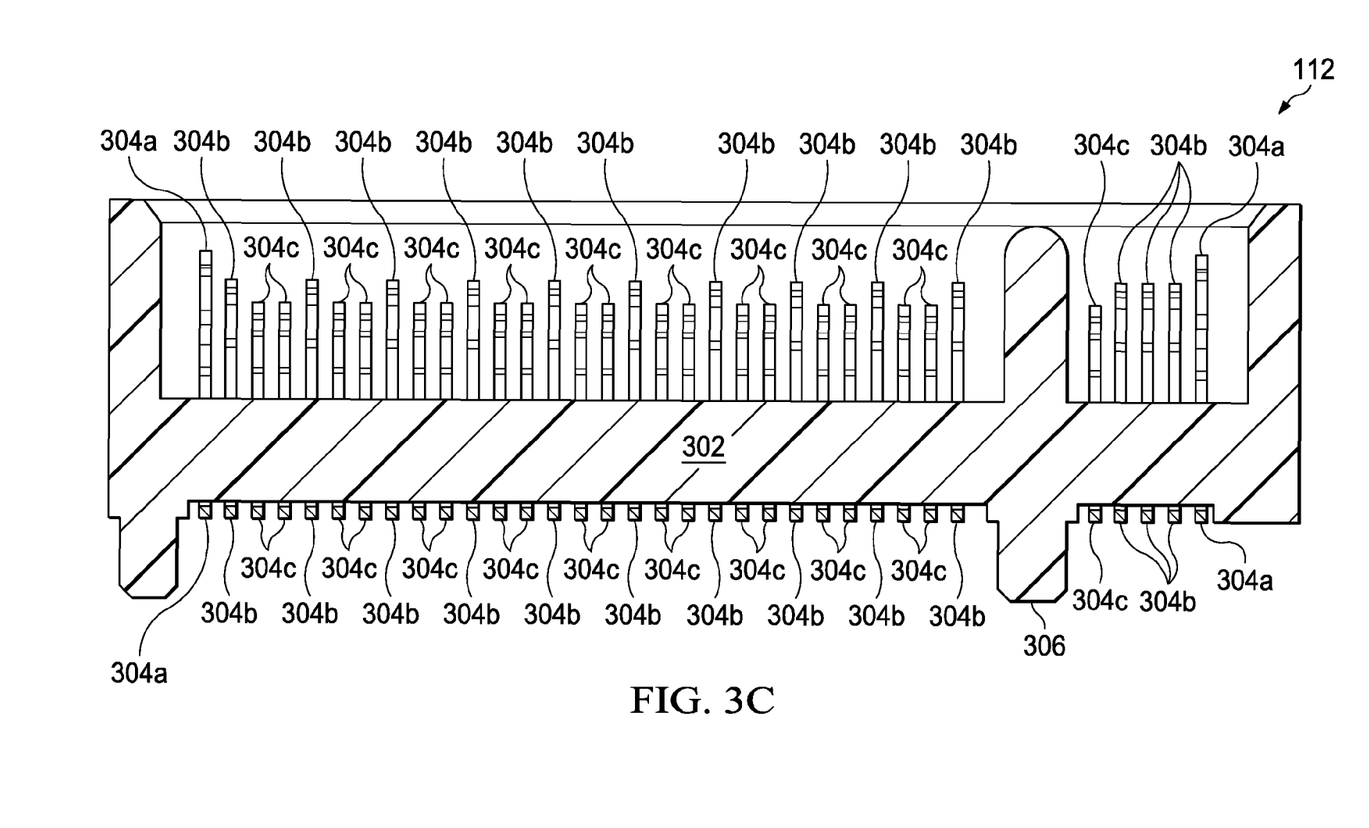

FIGS. 3A-3C each illustrate different views of a receptacle connector 112, in accordance with embodiments of the present disclosure. FIG. 3A depicts a first perspective view, FIG. 3B depicts a second perspective view, and FIG. 3C depicts a cross-sectional elevation view in the direction A-A shown in FIG. 3A. As shown in FIGS. 3A-3C, receptacle connector 112 may comprise a housing 302 which partially encloses electrically-conductive pins 304 (e.g., pins, 304a, 304b, 304c, and 304d). Housing 302 may include openings and/or pass-throughs through which pins 304 may pass from inside of housing 302 to the bottom 306 of housing 302, such that pins 304 may be coupled to corresponding conductive traces of motherboard 116. Within housing 302, each pin 304 may engage with and electrically couple to a corresponding pin of an information handling resource 110, such that when an information handling resource 110 is inserted into receptacle connector 112, such corresponding pins may be electrically coupled to associated traces of motherboard 116. Housing 302 may be formed from plastic or any other suitable material.

As shown in FIGS. 3A-3C, pins 304 along one side internal to housing 302 may be staggered in the sense that some pins 304 may be of different lengths than other pins. For example, pins 304a may be of a first length, pins 304b may be of a second length substantially shorter than the first length, and pins 304c may be of a third length substantially shorter than the second length. Because of these staggered lengths, as an information handling resource 110 is inserted into receptacle connector 112, its pins may first engage with pins 304a, then with pins 304b, then pins 304c. Accordingly, as information handling system 110 is inserted, the pins of information handling resource 110 may become active in a particular sequential order. For example, pins 304a may comprise ground pins, pins 304b may comprise source voltage pins, ground pins, and certain control signal pins (e.g., presence detection pins), and pins 304c may comprise pins for remaining signals. In accordance with such example, pins of information handling resource 110 corresponding to pins 304a may first engage with pins 304a, then pins of information handling resource 110 corresponding to pins 304b may engage with pins 304b, after which pins of information handling resource 110 corresponding to pins 304b may engage with pins 304c. By allowing an information handling resource 110 to first couple to ground pins before other pins, a ground plane or ground grid of information handling resource 110 may be allowed to settle to ground voltage prior to other pins of information handling resource 110 becoming active, which may reduce undesirable phenomena such as electrostatic discharge, ground bounce, floating ground, and other phenomena. Such sequential activation of pins of information handling resource 110 may allow for hot-pluggability of information handling resources that conform to a standard that otherwise would not support hot-pluggability.

Also as shown in FIGS. 3A-3C, pins 304d may be located internal to housing 302 opposite of pins 304a-304c, and may engage with corresponding pins of information handling resource 110 opposite to pins corresponding to pins 304a-304c. In some embodiments such pins 304d may be of different, staggered lengths, such as is the case with pins 304a-304c. For example, in some embodiments, as shown in FIG. 3B, one or more pins 304d (e.g., the rightmost-pin 304d shown in FIG. 3B) may be similar in length to pins 304b while one or more pins 304d (e.g., all pins 304d other than the rightmost-pin 304d shown in FIG. 3B) may be similar in length to pins 304c.

One potential problem that arises due to extended pins 304a is that when an information handling system 110 is inserted into receptacle connector 112, such extended pins 304a may "roll off" their corresponding pins of information handling system 110 and may come in contact with exposed conductive elements (e.g., signal traces, vias) information handling resource 110, causing improper functionality.

Figure 4A:
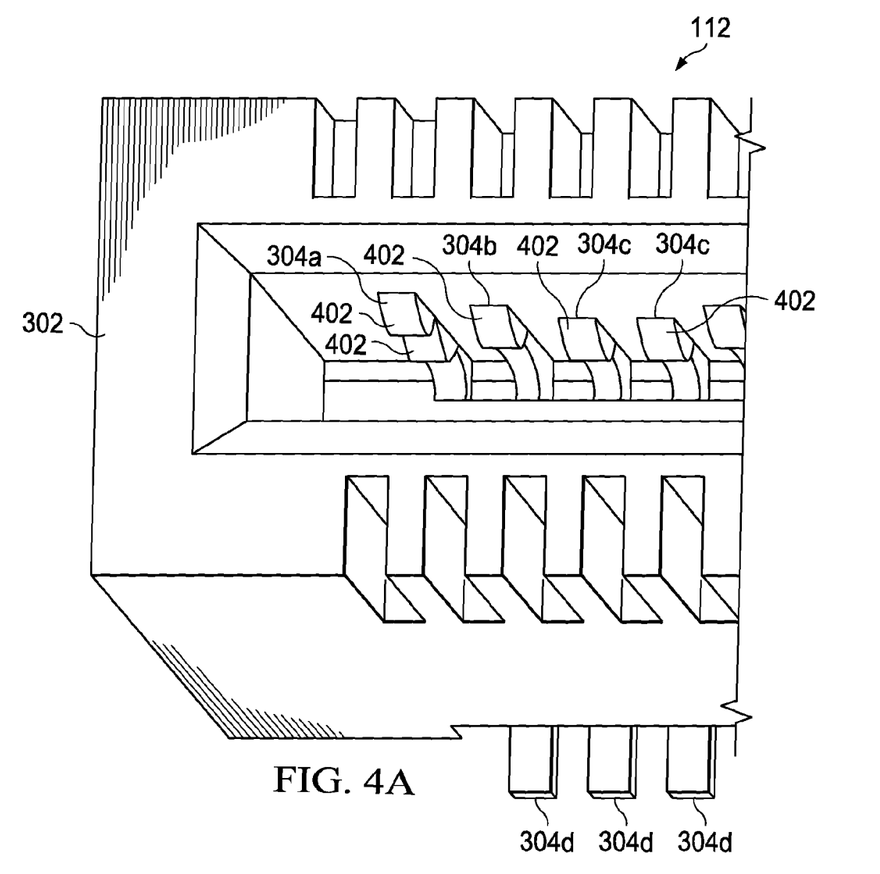
FIGS. 4A and 4B each illustrate detail of the view of FIG. 3A, in accordance with embodiments of the present disclosure.
Figure 4B:
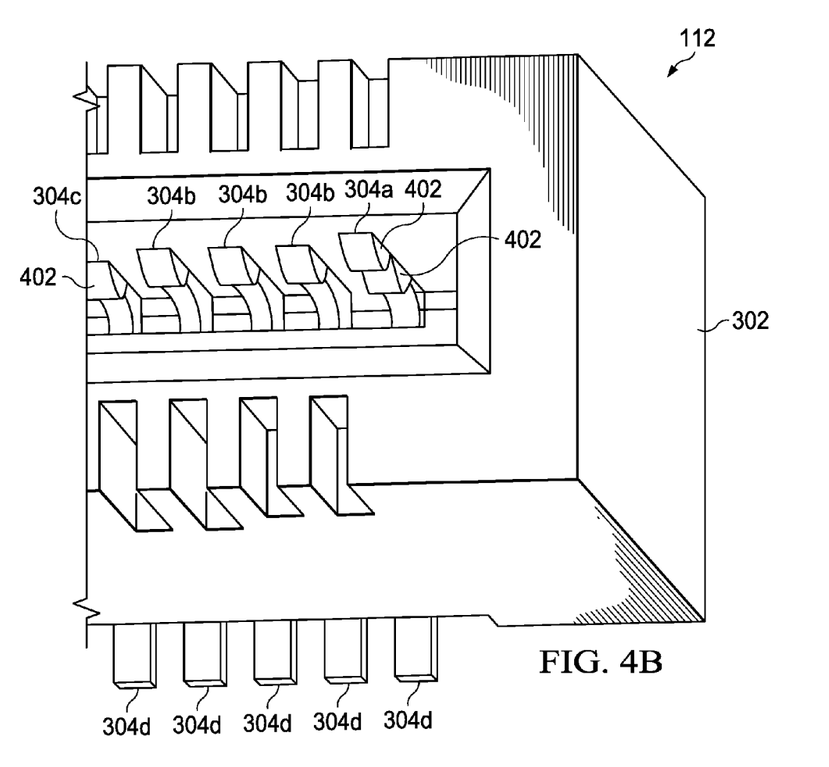

FIGS. 4A and 4B each illustrate detail of some of pins 304a, 304b, and 304c of the view of FIG. 3A, in accordance with embodiments of the present disclosure. As shown in FIGS. 4A and 4B, pins 304a may each include two contact bumps 402 while other pins 304b and 304c may each include one contact bump 402. Such contact bumps 402 are formed in pins 304, and pins 304 are often biased with a spring force, such that contact bumps 402 maintain electrical contact between pins 304 and their corresponding pins of information handling resource 110. The inclusion of two (or more) contact bumps 402 within a pin 304a may reduce the problem of an extended pin 304a coming in contact with a pin other than its corresponding pin of information handling resource 110, as once a first contact bump 402 rolls off its corresponding pin of information handling resource 110 during insertion, a second contact bump of extended pin 304a may maintain ground contact with the corresponding pin of information handling resource 110 while causing the first contact bump 402 to raise such that it is suspended, preventing unintended contact. Such approach may also allow for greater staggered distance lengths of pins 304a-304d for instances in which the pins of a "standardized" plug or edge connector of an information handling resource are too short to support such greater distance lengths. Increasing the staggered distance between pin groups may facilitate the satisfaction of timing requirements for insertion or removal of information handling resource 110.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A receptacle connector, comprising:
   a housing;
   a first pin of a first length disposed in the housing and configured to be coupled to a first corresponding pin of an information handling resource receivable by the receptacle connector, wherein the information handling resource conforms to an M.2 physical connector standard that does not include hot-plugging, and wherein the first pin of the receptacle connector comprises two contact bumps for maintaining electrical contact with the first corresponding pin of the information handling resource; and
   a second pin of a second length disposed in the housing and configured to be coupled to a second corresponding pin of the information handling resource, wherein:
     the second length is substantially shorter than the first length such that when the information handling resource is inserted into the receptacle connector, the first corresponding pin of the information handling resource is configured to engage with the first pin of the receptacle connector before the second corresponding pin of the information handling resource engages with the second pin of the receptacle connector, such that the information handling resource is capable of being safely hot-plugged into the receptacle connector; and
     the second pin of the receptacle connector comprises one contact bump for maintaining electrical contact with the second corresponding pin of the information handling resource.

2. The receptacle connector of claim 1, further comprising a third pin of a third length disposed in the housing and configured to be coupled to a third corresponding pin of the information handling resource, wherein the third length is substantially shorter than the second length such that when the information handling resource is inserted into the receptacle connector, the second corresponding pin engages with the second pin before the third corresponding pin engages with the third pin.

3. The receptacle connector of claim 2, wherein when the information handling resource is inserted into the receptacle connector while the receptacle connector is in a powered-on state, the first corresponding pin is configured to become electrically active before the second corresponding pin, and the second corresponding pin becomes electrically active before the third corresponding pin.

4. The receptacle connector of claim 1, wherein when the information handling resource is inserted into the receptacle connector while the receptacle connector is in a powered-on state, the first corresponding pin is configured to become electrically active before the second corresponding pin.

5. The receptacle connector of claim 1, wherein the first pin comprises a ground pin and the second pin comprises a pin other than a ground pin.

6. The receptacle connector of claim 1, wherein the second pin comprises exactly one contact bump for maintaining electrical contact with the second corresponding pin.

7. The receptacle connector of claim 1, the first pin configured such that when a second contact bump of the two contact bumps engages with the first corresponding pin, a first contact bump of the two contact bumps is suspended so as to avoid contact of the first pin to portions of the information handling resource other than the first corresponding pin.

8. An information handling system comprising:
a processor; and
a receptacle connector communicatively coupled to the processor, the receptacle connector comprising:
   a housing;
   a first pin of a first length disposed in the housing and configured to be coupled to a first corresponding pin of an information handling resource receivable by the receptacle connector, wherein the information handling resource conforms to an M.2 physical connector standard that does not include hot-plugging, and wherein the first pin of the receptacle connector comprises two contact bumps for maintaining electrical contact with the first corresponding pin of the information handling resource; and
   a second pin of a second length disposed in the housing and configured to be coupled to a second corresponding pin of the information handling resource, wherein:
      the second length is substantially shorter than the first length such that when the information handling resource is inserted into the receptacle connector, the first corresponding pin of the information handling resource is configured to engage with the first pin of the receptacle connector before the second corresponding pin of the information handling resource engages with the second pin of the receptacle connector, such that the information handling resource is capable of being safely hot-plugged into the receptacle connector; and
      the second pin of the receptacle connector comprises one contact bump for maintaining electrical contact with the second corresponding pin of the information handling resource.

9. The information handing system of claim 8, wherein the receptacle connector further comprises a third pin of a third length disposed in the housing and configured to be coupled to a third corresponding pin of the information handling resource, wherein the third length is substantially shorter than the second length such that when the information handling resource is inserted into the receptacle connector, the second corresponding pin is configured to engage with the second pin before the third corresponding pin engages with the third pin.

10. The information handling system of claim 9, wherein when the information handling resource is inserted into the receptacle connector while the receptacle connector is in a powered-on state, the first corresponding pin is configured to become electrically active before the second corresponding pin, and the second corresponding pin becomes active before the third corresponding pin.

11. The information handling system of claim 8, wherein when the information handling resource is inserted into the receptacle connector while the receptacle connector is in a powered-on state, the first corresponding pin is configured to become electrically active before the second corresponding pin.

12. The information handling system of claim 8, wherein the first pin comprises a ground pin and the second pin comprises a pin other than a ground pin.

13. The information handling system of claim 8, wherein the information handling resource is a storage device.

14. The information handling system of claim 8, the first pin configured such that when a second contact bump of the two contact bumps engages with the first corresponding pin, a first contact bump of the two contact bumps is suspended so as to avoid contact of the first pin to portions of the information handling resource other than the first corresponding pin.

15. A method for engaging an information handling resource with a receptacle connector, comprising:
   engaging a first pin of a first length disposed in a housing of the receptacle connector with a first corresponding pin of the information handling resource, wherein the information handling resource conforms to an M.2 physical connector standard that does not include hot-plugging, and wherein the first pin of the receptacle connector comprises two contact bumps for maintaining electrical contact with the first corresponding pin of the information handling resource; and
   after engaging the first pin with the first corresponding pin, engaging a second pin of a second length disposed in the housing with a second corresponding pin of the information handling resource, wherein:
      the second length is substantially shorter than the first length;
      the second pin of the receptacle connector comprises one contact bump for maintaining electrical contact with the second corresponding pin of the information handling resource; and
      the receptacle connector is in a powered-on state during the engaging the first pin and the engaging the second pin, such that the information handling resource is safely hot-plugged into the receptacle connector.

16. The method of claim 15, further comprising after engaging the second pin with the second corresponding pin, engaging a third pin of a third length disposed in the housing with a third corresponding pin of the information handling resource, wherein the third length is substantially shorter than the second length.

17. The method of claim 16, wherein when the information handling resource is inserted into the receptacle connector, the first corresponding pin becomes electrically active before the second corresponding pin, and the second corresponding pin becomes electrically active before the third corresponding pin.

18. The method of claim 15, wherein when the information handling resource is inserted into the receptacle connector, the first corresponding pin becomes electrically active before the second corresponding pin.

19. The method of claim 15, wherein the first pin comprises a ground pin and the second pin comprises a pin other than a ground pin.

20. The method of claim 15, wherein the information handling resource is a storage device.

21. The method of claim 15, the first pin configured such that when a second contact bump of the two contact bumps engages with the first corresponding pin, a first contact bump of the two contact bumps is suspended so as to avoid contact of the first pin to portions of the information handling resource other than the first corresponding pin.

* * * * *